US012784513B2

(12) United States Patent
Salter et al.

(10) Patent No.: US 12,784,513 B2
(45) Date of Patent: Nov. 3, 2026

(54) SYSTEMS AND METHODS FOR INSPECTING A VEHICLE

(71) Applicant: Ford Global Technologies, LLC, Dearborn, MI (US)

(72) Inventors: Stuart C. Salter, White Lake, MI (US); Krishna Bandi, Novi, MI (US); Mario Anthony Santillo, Canton, MI (US); Brendan Diamond, Naples, FL (US); Vyas Darshan Shenoy, Canton, MI (US); Ryan O'Gorman, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 18/934,831

(22) Filed: Nov. 1, 2024

(65) Prior Publication Data

US 2026/0127917 A1 May 7, 2026

(51) Int. Cl.
*G07C 5/00* (2006.01)
*G06T 7/00* (2017.01)
*G07C 5/08* (2006.01)

(52) U.S. Cl.
CPC ............ *G07C 5/008* (2013.01); *G06T 7/0004* (2013.01); *G07C 5/0808* (2013.01); *G07C 5/0816* (2013.01); *G06T 2207/30252* (2013.01)

(58) Field of Classification Search
CPC .... G07C 5/008; G07C 5/0808; G07C 5/0816; G06T 7/0004; G06T 2207/30252
See application file for complete search history.

(56) References Cited

U.S. PATENT DOCUMENTS

| | | | | |
|---|---|---|---|---|
| 10,885,727 | B2 * | 1/2021 | Manoria | B62D 65/005 |
| 11,243,547 | B2 * | 2/2022 | Miller | G05D 1/0225 |
| 11,263,838 | B2 * | 3/2022 | Patnaik | B60W 50/0205 |
| 11,752,631 | B2 | 9/2023 | Panigrahi et al. | |
| 2009/0261966 | A1 * | 10/2009 | Cutchis | G08B 13/19647 340/522 |
| 2011/0022248 | A1 * | 1/2011 | McQuade | G06Q 10/06 701/2 |
| 2019/0095725 | A1 | 3/2019 | Kalghatgi et al. | |
| 2019/0227570 | A1 * | 7/2019 | Miller | G05D 1/223 |
| 2020/0232884 | A1 * | 7/2020 | Onekea | G06F 18/22 |
| 2022/0366736 | A1 * | 11/2022 | Nistler | G07C 5/0808 |
| 2023/0145508 | A1 | 5/2023 | Kaphengst et al. | |
| 2023/0245505 | A1 * | 8/2023 | Kobayashi | B60W 50/0205 701/31.4 |
| 2024/0087107 | A1 | 3/2024 | Knuffman et al. | |
| 2024/0317262 | A1 * | 9/2024 | Tam | B60W 60/0025 |

* cited by examiner

*Primary Examiner* — Peter D Nolan
*Assistant Examiner* — Demetra R Smith-Stewart
(74) *Attorney, Agent, or Firm* — Burris Law, PLLC

(57) ABSTRACT

A method includes the generation of an inspection-related checklist based on one or more functions of a vehicle, the receipt of one or more commands to perform a vehicle function of the one or more vehicle functions, the performance of the vehicle function wherein one or more additional vehicles is configured to perform an inspection of the vehicle function while the vehicle is performing the vehicle function, and the transmission of an alert in response to the vehicle not passing the inspection.

20 Claims, 6 Drawing Sheets

SYSTEMS AND METHODS FOR INSPECTING A VEHICLE

FIELD

The present disclosure relates to inspecting a vehicle. More specifically, the present disclosure relates to inspecting the vehicle with one or more surrounding vehicles related to a position of the vehicle.

BACKGROUND

The statements in this section merely provide background information related to the present disclosure and may not constitute prior art.

As manufacturing facilities grow in size, additional infrastructure elements are required to maintain marshaling across a marshaling environment related to the manufacturing facility. Despite adequate infrastructure-provided coverage of the marshaling environment, accuracy associated with an automated inspection of a marshaled vehicle can present one or more issues, such as insufficient angles and lighting. As a result, human operators are tasked with performing the inspection of the marshaled vehicle, but only at certain intervals during an assembly process. Such limited inspection(s) of the marshaled vehicle can present issues to the assembly process.

The present disclosure addresses these and other issues related to inspecting a vehicle.

SUMMARY

This section provides a general summary of the disclosure and is not a comprehensive disclosure of its full scope or all of its features.

The present disclosure provides a method comprising: generating, by a vehicle, an inspection-related checklist based on one or more vehicle functions of the vehicle; receiving, from one or more additional vehicles, one or more commands to perform a vehicle function of the one or more vehicle functions on the inspection-related checklist; performing, by the vehicle, the vehicle function in response to the receipt of the one or more commands, wherein the one or more additional vehicles is configured to perform an inspection of the vehicle function while the vehicle is performing the vehicle function; and transmitting, by the vehicle, an alert in response to not passing the inspection; wherein the receipt of the one or more commands is further based on a pose of the vehicle being within a field of view of the one or more additional vehicles, and wherein the field of view of the one or more additional vehicles is associated with the vehicle function; wherein the inspection of the vehicle function is a visual inspection performed by an exterior sensor suite of the one or more additional vehicles; wherein the exterior sensor suite is permanently integrated within a body of the one or more additional vehicles or temporarily affixed to the body of the one or more additional vehicles; wherein a different vehicle function of the one or more vehicle functions is performed in different geofenced locations in which the vehicle is positioned; wherein the transmission of the alert causes the one or more additional vehicles to perform an additional inspection of the vehicle function, and wherein: one or more diagnostic actions are performed on the vehicle to cause the vehicle to pass the additional inspection; and wherein the one or more additional vehicles is further configured to perform an inspection of a vehicle feature, a vehicle quality, or a combination thereof.

The present disclosure provides a system comprising: a vehicle configured to: generate an inspection-related checklist based on one or more vehicle functions of the vehicle, receive one or more commands to perform a vehicle function of the one or more vehicle functions on the inspection-related checklist, perform the vehicle function in response to the receipt of the one or more commands, and transmit an alert in response to not passing an inspection of the vehicle function; and one or more additional vehicles configured to: transmit the one or more commands to perform the vehicle function, and perform the inspection of the vehicle function while the vehicle is performing the vehicle function; wherein the receipt of the one or more commands is further based on a pose of the vehicle being within a field of view of the one or more additional vehicles, and wherein the field of view of the one or more additional vehicles is associated with the vehicle function; wherein the inspection of the vehicle function is a visual inspection performed by an exterior sensor suite of the one or more additional vehicles; wherein the exterior sensor suite is permanently integrated within a body of the one or more additional vehicles or temporarily affixed to the body of the one or more additional vehicles; wherein a different vehicle function of the one or more vehicle functions is performed in different geofenced locations in which the vehicle is positioned; wherein the one or more additional vehicles is further configured to: identify one or more impaired components of the vehicle in response to the vehicle performing the vehicle function; and wherein the transmission of the alert causes the one or more additional vehicles to perform an additional inspection of the vehicle function, and wherein: one or more diagnostic actions are performed on the vehicle to cause the vehicle to pass the additional inspection.

The present disclosure provides one or more non-transitory computer-readable media storing processor-executable instructions that, when executed by at least one processor, cause the at least one processor to: generate, by a vehicle, an inspection-related checklist based on one or more vehicle functions of the vehicle; receive, from one or more additional vehicles, one or more commands to perform a vehicle function of the one or more vehicle functions on the inspection-related checklist; perform, by the vehicle, the vehicle function in response to the receipt of the one or more commands, wherein the one or more additional vehicles is configured to perform an inspection of the vehicle function while the vehicle is performing the vehicle function; and transmit, by the vehicle, an alert in response to not passing the inspection; wherein the receipt of the one or more commands is further based on a pose of the vehicle being within a field of view of the one or more additional vehicles, and wherein the field of view of the one or more additional vehicles is associated with the vehicle function; and wherein the inspection of the vehicle function is a visual inspection performed by an exterior sensor suite of the one or more additional vehicles; wherein the exterior sensor suite is permanently integrated within a body of the one or more additional vehicles or temporarily affixed to the body of the one or more additional vehicles; wherein a different vehicle function of the one or more vehicle functions is performed in different geofenced locations in which the vehicle is positioned; wherein the transmission of the alert causes the one or more additional vehicles to perform an additional inspection of the vehicle function, and wherein: one or more diagnostic actions are performed on the vehicle to cause the vehicle to pass the additional inspection.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
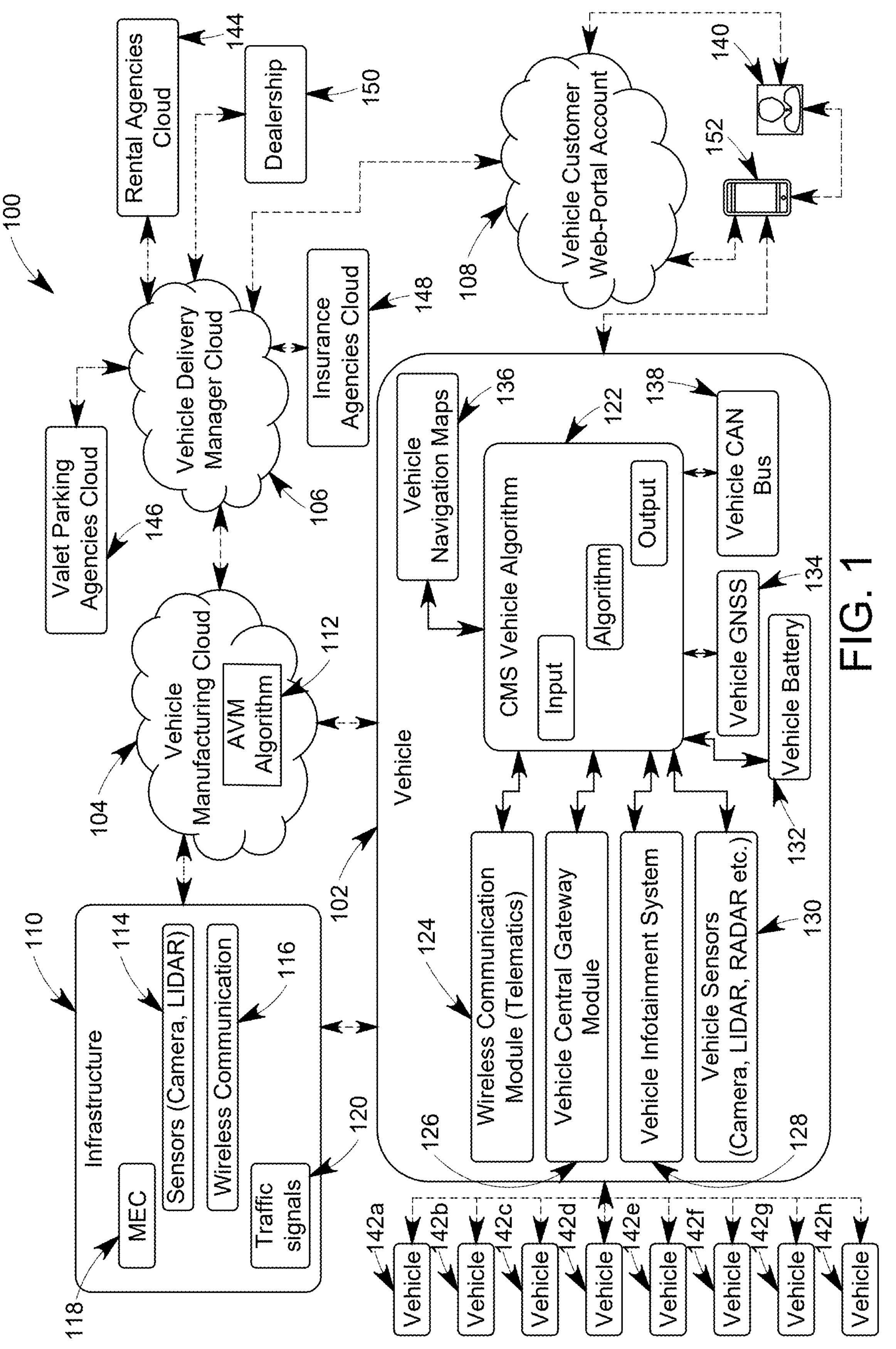
FIG. 1 illustrates a system for automated vehicle marshaling in accordance with one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provides a means for inspecting a vehicle with one or more surrounding vehicles related to a location of the vehicle. In one or more embodiments, the systems and methods provided to enhance the inspection of the vehicle are implemented within a vehicle-based automated plant marshaling inspection system that utilizes surrounding "observing" vehicles to monitor a "test" vehicle to ensure the test vehicle passes one or more inspections and/or realizes correct functionality for various systems of the test vehicle. As an example, the one or more inspections can occur through simple observation by the observing vehicle and/or via the observing vehicle commanding the test vehicle to perform specific desired functions based on a relative completeness of the test vehicle during assembly of the test vehicle.

FIG. 1 shows a schematic block diagram illustrative of an automated vehicle marshaling (AVM) system 100. In one or more examples, the AVM system 100 marshals one or more vehicles (e.g., a vehicle 102) traveling at a low speed. However, it is understood that the AVM system 100 may marshal the one or more vehicles traveling at any speed. It is also understood that the AVM system 100 may marshal semi-autonomous vehicles and/or fully autonomous vehicles.

The AVM system 100 generally includes the vehicle 102, a vehicle manufacturing cloud system 104, a vehicle delivery manager cloud system 106, a vehicle customer web-portal account cloud system 108, and an infrastructure system 110. The vehicle manufacturing cloud system 104 operates as the central cloud system that manages and/or facilitates any manufacturing process associated with the vehicle 102. The vehicle manufacturing cloud system 104 is configured to wirelessly communicate with the vehicle delivery manager cloud system 106 and/or the infrastructure system 110. The vehicle manufacturing cloud system 104 is also configured to wirelessly communicate with the vehicle 102.

Figure 3:
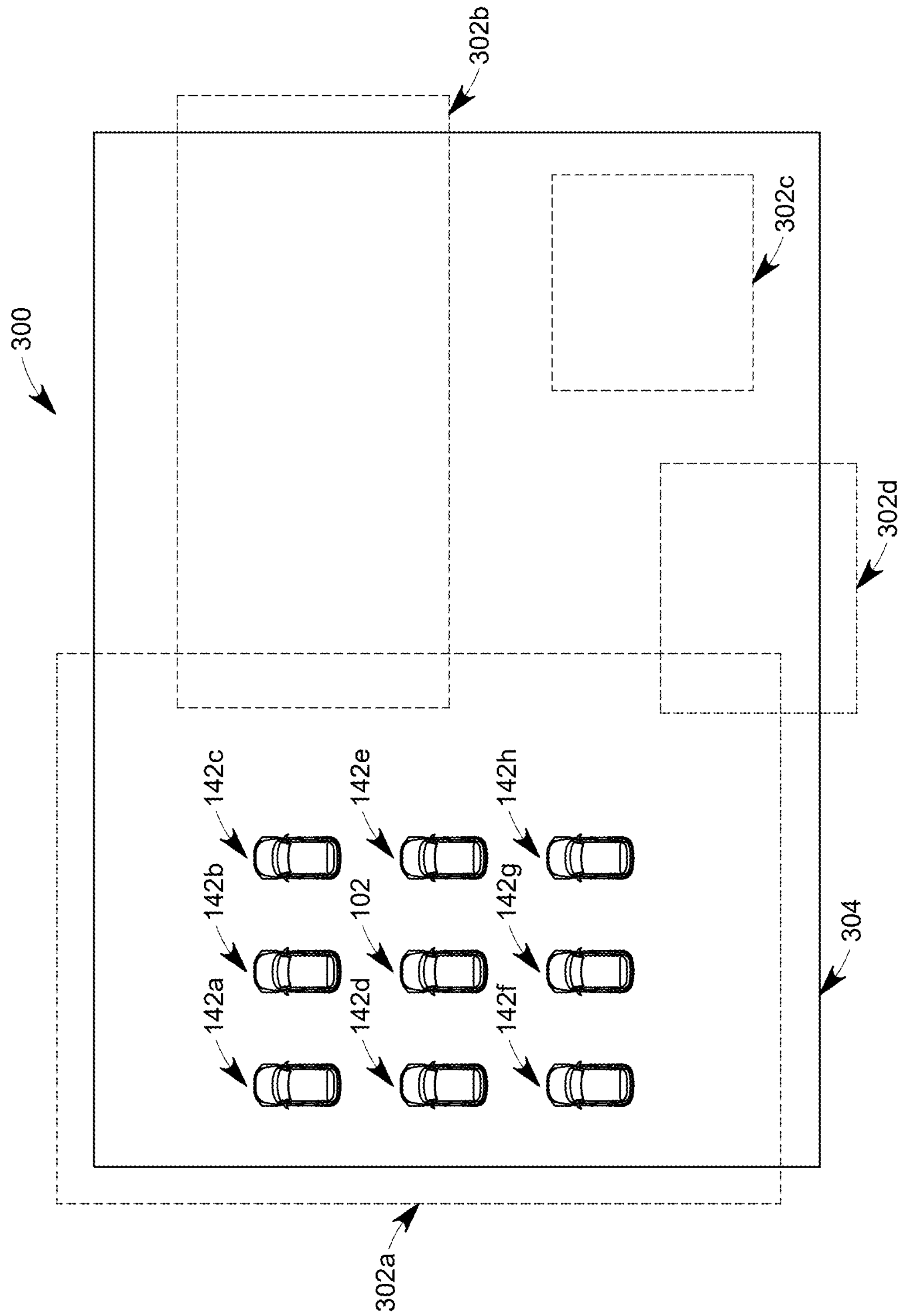
FIG. 3 illustrates an implementation of a system for automated vehicle marshaling and inspection of a vehicle in accordance with one or more embodiments of the present disclosure.

The vehicle manufacturing cloud system 104 can include an infrastructure-side AVM algorithm 112. The infrastructure-side AVM algorithm 112 processes status information associated with at least the vehicle 102 of the one or more vehicles. It is understood that the infrastructure-side AVM algorithm 112 processes status information associated with each vehicle of the one or more vehicles (e.g., the vehicle 102), in one or more embodiments. The vehicle manufacturing cloud system 104 is configured to cause the infrastructure system 110 to monitor the progression of the one or more vehicles (e.g., the vehicle 102) as the vehicle(s) progress through a marshaling environment (e.g., a marshaling environment 304 as shown in FIG. 3). For example, the marshaling environment 304 can represent a plant marshaling setting, an automated charging setting, a depot marshaling setting, or an underground parking setting. As an example, the plant marshaling setting can include an instance wherein just-built vehicles are moved through end-of-line testing at a vehicle assembly plant via overhead vision sensing (e.g., one or more sensors 114). As another example, the plant marshaling setting can also include an instance wherein vehicles are caused to move (e.g., marshaled) through the vehicle assembly plant (e.g., from a workstation to another workstation) via the overhead vision sensing. As another example, the automated charging setting can include an instance wherein vehicles are correctly allocated to automated charging modalities located outdoor or indoor. As a further example, the depot marshaling setting can include an instance wherein a commercial fleet of vehicles are moved through warehouses and depots to load and/or process items automatically. As an additional example, the underground parking setting can include an instance wherein vehicles are moved through underground or covered parking environments with a potentially inconsistent communication network such as a global navigation satellite system.

The vehicle manufacturing cloud system 104 is also configured to cause the infrastructure system 110 to communicate with the one or more vehicles. For example, the vehicle manufacturing cloud system 104 utilizes the infrastructure-side AVM algorithm 112 to send instructions to the infrastructure system 110 and/or to process information received from the infrastructure system 110. The vehicle manufacturing cloud system 104 is also configured to cause the vehicle delivery manager cloud system 106 to facilitate a delivery of the one or more vehicles (e.g., the vehicle 102) to various locations. For example, the vehicle manufacturing cloud system 104 utilizes the infrastructure-side AVM algorithm 112 to send instructions to the vehicle delivery manager cloud system 106 and/or to process information received from the vehicle delivery manager cloud system 106.

The vehicle manufacturing cloud system 104 is further configured to communicate directly with the one or more vehicles to cause the one or more vehicles to start, stop, or pause progression through the marshaling environment 304. The vehicle manufacturing cloud system 104 is further configured to control a marshaling speed of the one or more vehicles as the one or more vehicles travel through (e.g., traverse) the marshaling environment 304. For example, the vehicle manufacturing cloud system 104 utilizes the infrastructure-side AVM algorithm 112 to send instructions to the vehicle 102 and/or to process information received from the vehicle 102.

The infrastructure system 110 includes the one or more sensors 114, a wireless communication component 116, a multi-access edge computing (MEC) system 118, and one or more traffic signals 120. It is understood that the MEC system 118 is configured to support communication between the wireless communication component 116 and the vehicle 102. It is understood, however, that the MEC system 118 is also configured to support communication between the wireless communication component 116 and any of the vehicle manufacturing cloud system 104, the vehicle delivery manager cloud system 106, and/or the vehicle customer web-portal account cloud system 108. For example, the wireless communication component 116 may utilize GPS, Wi-Fi, satellite, 3G/4G/5G, and/or Bluetooth® to communicate with the one or more vehicles.

The wireless communication component 116 also communicates with the one or more sensors 114 that is configured to manage and/or include, for example, one or more of cameras, lidar, radar, and/or ultrasonic devices. The one or more sensors 114 monitors the movement of the one or more vehicles as the vehicle(s) are marshaled through the marshaling environment 304. Additionally, the wireless communication component 116 is also in communication with the traffic signals 120. For example, the wireless communication component 116 may cause the traffic signals 120 to direct traffic of the one or more vehicles as the one or more vehicles are marshaled through the marshaling environment 304. It is understood that the infrastructure system 110 can forward instructions received from the vehicle manufacturing cloud system 104 to the vehicle 102. However, it is also understood that the infrastructure system 110 can send instructions to the vehicle 102 directly through the utilization of the MEC system 118, for example.

The vehicle 102 includes a vehicle-side AVM algorithm 122, a wireless transmission module 124, a vehicle central gateway module 126, a vehicle infotainment system 128, one or more vehicle sensors 130, a vehicle battery 132, a vehicle GNSS 134, a vehicle navigation mapping system 136, and a controller area network (CAN) vehicle bus 138. The wireless transmission module 124 may be a transmission control unit (TCU) and/or may be supported by telematically supported subsystems. The wireless transmission module 124 includes one or more sensors that is configured to gather data and send signals to other components of the vehicle 102. The one or more sensors of the wireless transmission module 124 may include a vehicle speed sensor (not shown) configured to determine a current speed of the vehicle 102; a wheel speed sensor (not shown) configured to determine if the vehicle 102 is traveling at an incline or a decline; a throttle position sensor (not shown) configured to determine if a downshift or upshift of one or more gears associated with the vehicle 102 is required in a current status of the vehicle 102; and/or a turbine speed sensor (not shown) configured to send data associated with a rotational speed of a torque converter of the vehicle 102.

The wireless transmission module 124 communicates information, gathered by the one or more sensors, to the vehicle-side AVM algorithm 122. In one embodiment, the vehicle-side AVM algorithm 122 may be disposed as a component within the wireless transmission module 124. For example, the vehicle 102 utilizes the vehicle-side AVM algorithm 122 to process and send information gathered by the one or more sensors to the infrastructure system 110. As another example, the vehicle 102 utilizes the vehicle-side AVM algorithm 122 to process and send information gathered by the one or more sensors to the vehicle manufacturing cloud system 104 directly. The vehicle-side AVM algorithm 122 is configured to communicate information and/or instructions to the wireless transmission module 124 received from the infrastructure system 110 and/or the vehicle manufacturing cloud system 104.

The vehicle central gateway module 126 operates as an interface between various vehicle domain bus systems, such as an engine compartment bus (not shown), an interior bus (not shown), an optical bus for multimedia (not shown), a diagnostic bus for maintenance (not shown), or the vehicle CAN bus 138. The vehicle central gateway module 126 is configured to distribute data communicated to the vehicle central gateway module 126 by each of the various domain bus systems to other components of the vehicle 102. The vehicle central gateway module 126 is also configured to distribute information received from the vehicle-side AVM algorithm 122 to the various domain bus systems. The vehicle central gateway module 126 is further configured to send information to the vehicle-side AVM algorithm 122 received from the various domain bus systems. For example, the vehicle 102 utilizes the vehicle-side AVM algorithm 122 to process and send information received from the vehicle central gateway module 126 to the infrastructure system 110. As another example, the vehicle 102 utilizes the vehicle-side AVM algorithm 122 to process and send information received from the vehicle central gateway module 126 to the vehicle manufacturing cloud system 104 directly. The vehicle-side AVM algorithm 122 is configured to communicate information and/or instructions to the vehicle central gateway module 126 received from the infrastructure system 110 and/or the vehicle manufacturing cloud system 104.

The vehicle infotainment system 128 delivers a combination of information and entertainment content and/or services to a user 140 of the vehicle 102. It is understood that the vehicle infotainment system 128 can deliver only entertainment content to the user 140 of the vehicle 102, in some examples. It is also understood that the vehicle infotainment system 128 can deliver information services to anyone associated with the vehicle 102, in other examples. As an example, the vehicle infotainment system 128 includes built-in car computers that combine one or more functions, such as digital radios, built-in cameras, and/or televisions. The vehicle infotainment system 128 communicates information associated with the built-in car computers or processors to the vehicle-side AVM algorithm 122. For example, the vehicle 102 utilizes the vehicle-side AVM algorithm 122 to process and send information received from the vehicle infotainment system 128 to the infrastructure system 110. As another example, the vehicle 102 utilizes the vehicle-side AVM algorithm 122 to process and send information received from the vehicle infotainment system 128 to the vehicle manufacturing cloud system 104 directly. The vehicle-side AVM algorithm 122 is configured to communicate information and/or instructions to the vehicle infotainment system 128 received from the infrastructure system 110 and/or the vehicle manufacturing cloud system 104.

The one or more vehicle sensors 130 may be, for example, one or more of cameras, lidar, radar, and/or ultrasonic devices. For example, ultrasonic devices utilized as the one or more vehicle sensors 130 emit a high frequency sound wave that hits an object (e.g., a wall or another vehicle) and is then reflected back to the vehicle 102. Based on the amount of time it takes for the sound wave to return to the vehicle 102, the vehicle 102 can determine the distance between the one or more vehicle sensors 130 and the object. As another example, camera devices utilized as the one or more vehicle sensors 130 provide a visual indication of a space around the vehicle 102. As an additional example, radar devices utilized as the one or more vehicle sensors 130 emit electromagnetic wave signals that hit the object and is then reflected back to the vehicle 102. Based on the amount of time it takes for the electromagnetic waves to return to the vehicle 102, the vehicle 102 can determine a range, velocity, and angle of the vehicle 102 relative to the object.

The one or more vehicle sensors 130 is also utilized to perform an inspection of another vehicle, for example and as is discussed herein. The one or more vehicle sensors 130 communicate information associated with the position and/or distance at which the vehicle 102 is relative to the object to the vehicle-side AVM algorithm 122. The one or more vehicle sensors 130 also communicate information associated with the inspection to the vehicle-side AVM algorithm 122. For example, the vehicle 102 utilizes the vehicle-side AVM algorithm 122 to process and send information received from the one or more vehicle sensors 130 to the infrastructure system 110. As another example, the vehicle 102 utilizes the vehicle-side AVM algorithm 122 to process and send information received from the one or more vehicle sensors 130 to the vehicle manufacturing cloud system 104 directly. The vehicle-side AVM algorithm 122 is configured to communicate information and/or instructions to the one or more vehicle sensors 130 received from the infrastructure system 110 and/or the vehicle manufacturing cloud system 104.

The vehicle battery 132 is controlled by a battery management system (not shown) that provides instructions to the vehicle battery 132. For example, the battery management system provides instructions to the vehicle battery 132 based on a temperature of the vehicle battery 132. However, it is understood that the battery management system may provide instructions to the vehicle battery 132 based on any measure associated with the vehicle battery 132 such as power state of the vehicle 102, a time period of at least one day that the vehicle 102 is in an off-state, or a combination thereof. The battery management system ensures acceptable current modes of the vehicle battery 132. For example, the acceptable current modes protect against overvoltage, overcharge, and/or overheating of the vehicle battery 132. As another example, the temperature of the vehicle battery 132 indicates to the battery management system whether any of the acceptable current modes are within acceptable temperate ranges. The battery management system associated with the vehicle battery 132 communicates information associated with the temperature of the vehicle battery 132 to the vehicle-side AVM algorithm 122. For example, the vehicle 102 utilizes the vehicle-side AVM algorithm 122 to process and send information received regarding the vehicle battery 132 to the infrastructure system 110. As another example, the vehicle 102 utilizes the vehicle-side AVM algorithm 122 to process and send information regarding the vehicle battery 132 to the vehicle manufacturing cloud system 104 directly. The vehicle-side AVM algorithm 122 is configured to communicate information and/or instructions to the vehicle battery 132 received from the infrastructure system 110 and/or the vehicle manufacturing cloud system 104.

The vehicle GNSS 134 is configured to communicate with satellites so that the vehicle 102 can determine a specific location of the vehicle 102. The vehicle navigation mapping system 136 can display, via a display screen (not shown), the specific location of the vehicle 102 to the user 140. The vehicle GNSS 134 communicates geographical information associated with the vehicle 102 to the vehicle-side AVM algorithm 122. For example, the vehicle 102 utilizes the vehicle-side AVM algorithm 122 to process and send information received from the vehicle GNSS 134 to the infrastructure system 110. As another example, the vehicle 102 utilizes the vehicle-side AVM algorithm 122 to process and send information from the vehicle GNSS 134 to the vehicle manufacturing cloud system 104 directly. The vehicle-side AVM algorithm 122 is configured to communicate information and/or instructions to the vehicle GNSS 134 received from the infrastructure system 110 and/or the vehicle manufacturing cloud system 104. As another example, the vehicle 102 utilizes the vehicle-side AVM algorithm 122 to process and send information associated with the vehicle navigation mapping system 136 to the infrastructure system 110. As another example, the vehicle 102 utilizes the vehicle-side AVM algorithm 122 to process and send information from the vehicle navigation mapping system 136 to the vehicle manufacturing cloud system 104 directly. The vehicle-side AVM algorithm 122 is configured to communicate information and/or instructions to the vehicle navigation mapping system 136 received from the infrastructure system 110 and/or the vehicle manufacturing cloud system 104.

The vehicle 102 is configured to communicate any information associated with any of the components included within the vehicle 102 to one or more additional vehicles **142*a*-142*h*. The vehicle 102 is also configured to communicate (e.g., forward) any instructions received from the infrastructure system 110 and/or the vehicle manufacturing cloud system 104 to any of the one or more additional vehicles 142*a*-142*h*. For example, the communication of the vehicle 102 with the one or more additional vehicles 142*a*-142*h* can aid the infrastructure system 110 and/or the vehicle manufacturing cloud system 104 in marshaling the one or more additional vehicles 142*a*-142*h*. As another example, the one or more additional vehicles 142*a*-142*h* is configured to also inspect the vehicle 102. However, it is understood that any of the one or more additional vehicles 142*a*-142*h* or the vehicle 102** are configured to be able to inspect any other vehicle.

It is understood that each of the one or more additional vehicles **142*a*-142*h* can include any of the components described as being included within the vehicle 102, such as the vehicle-side AVM algorithm 122, the wireless transmission module 124, the vehicle central gateway module 126, the vehicle infotainment system 128, the one or more vehicle sensors 130, the vehicle battery 132, the vehicle GNSS 134, the vehicle navigation mapping system 136, and/or the CAN vehicle bus 138, for example. It is also understood that any of the one or more additional vehicles 142*a*-142*h* is configured to communicate information associated with any of the components included therein with the vehicle 102. It is further understood that the one or more additional vehicles 142*a*-142*h* can also be configured to establish a direct line of wireless communication (e.g., via a communication link) with the infrastructure system 110 and/or the vehicle manufacturing cloud system 104, whereby information can be directly exchanged between the one or more additional vehicles 142***a*-142*h* and the infrastructure system 110 and/or the vehicle manufacturing cloud system 104.

The vehicle delivery manager cloud system 106 wirelessly communicates (e.g., receives and/or sends instructions and/or information) with one or more of a rental agencies cloud system 144, a valet parking agencies cloud system 146, an insurance agencies cloud system 148, and/or a dealership system 150. The vehicle delivery manager cloud system 106 is configured to facilitate the delivery of the one or more vehicles to any of a rental agency (not shown) associated with the rental agencies cloud system 144, a valet parking agency (not shown) associated with the valet parking agencies cloud system 146, an insurance agency (not shown) associated with the insurance agencies cloud system 148, and/or the dealership system 150. The vehicle delivery manager cloud system 106 also wirelessly communicates with the vehicle customer web-portal account cloud system 108. It should be understood that other cloud systems can be included, in one or more examples.

The delivery manager cloud system 106 wirelessly communicates with a user device 152 such as a mobile device, a display panel, and/or a computer. The vehicle 102 is also configured to wirelessly communicate directly with the user device 152. For example, the user 140 engages with the user device 152 via an application that organizes any information and/or instructions received from the vehicle customer web-portal account cloud system 108 and/or the vehicle 102. As another example, the user 140 may send one or more instructions to the vehicle customer web-portal account cloud system 108 such as making a selection of which vehicle the user 140 would like to receive from any of the rental agency associated with the rental agencies cloud system 144, the valet parking agency associated with the valet parking agencies cloud system 146, the insurance agency associated with the insurance agencies cloud system 148, and/or the dealership system 150.

Figure 2:
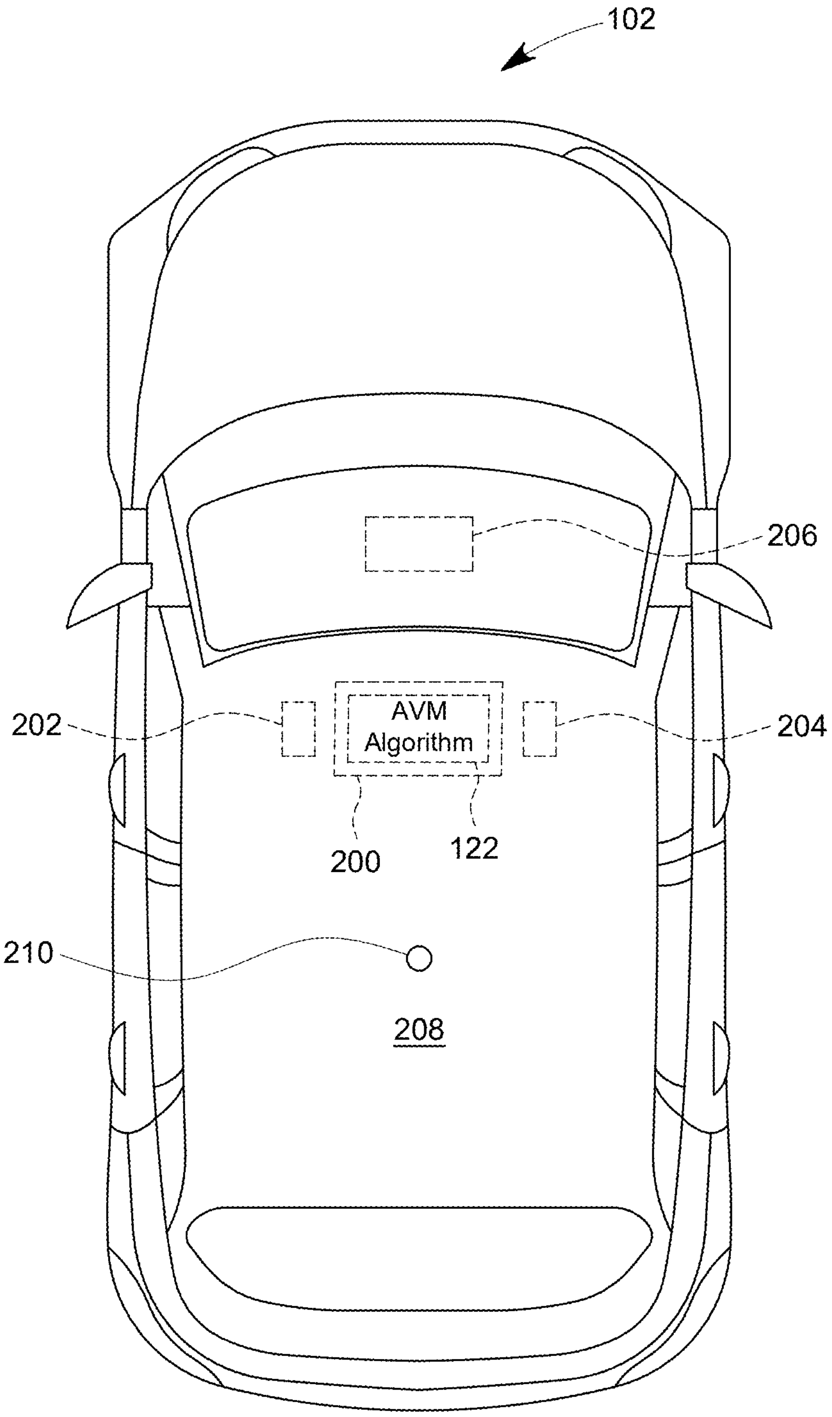
FIG. 2 illustrates an example vehicle marshaled by the system shown in FIG. 1 in accordance with one or more embodiments of the present disclosure.

Referring to FIG. 2, in various forms, the vehicle(s) 102 may be powered in a variety of ways, for example, with an electric motor and/or an internal combustion engine. It is understood that the vehicle(s) 102 may be any type of vehicle powered by an electric motor and/or an internal combustion engine such as a car, a truck, a robot, a plane, and/or a boat. The vehicle(s) 102 generally include the vehicle controller 200, one or more actuators 202, a plurality of on-board sensors 204, a human machine interface (HMI) 206, and a vehicle system 208. The vehicle(s) 102 also has a reference point 210, that is, a specified point within a space defined by a vehicle body that identifies the location of the vehicle(s) 102. For example, the reference point 210 is a geometrical center point at which respective longitudinal and lateral center axes of the vehicle(s) 102 intersects. As another example, the reference point 210 is a point at which the vehicle(s) 102 is located as the vehicle(s) 102 navigates toward a waypoint.

The vehicle controller 200, in some examples, is configured or programmed to control the operation of one or more of vehicle brakes, propulsion (e.g., control of acceleration in the vehicle(s) 102 by controlling one or more of an internal combustion engine, electric motor, hybrid engine, etc.), steering, climate control, interior and/or exterior lights, etc. The vehicle controller 200, in other examples, is further configured or programed to determine whether and when the vehicle controller 200, as opposed to a human operator, is to control such operations related to the vehicle(s) 102. It is understood that any of the operations associated with the vehicle(s) 102 may be facilitated via an automated, a semi-automated, or a manual mode. For example, the automated mode may facilitate any of the operations to be fully controlled by the vehicle controller 200 without the aid of the human operator. As another example, the semi-automated mode may facilitate any of the operations to be at least partially controlled by the human operator in combination with the vehicle controller 200. As a further example, the manual mode may facilitate the operations to be fully controlled by the human operator without the aid of the vehicle controller 200.

The vehicle controller 200 includes, or may be communicatively coupled to (e.g., via a vehicle communications bus), one or more processors (not shown). For example, the one or more processors can be a controller, or the like, included in the vehicle(s) 102 for monitoring and/or controlling various vehicle controllers, such as a powertrain controller, a brake controller, a steering controller, etc. The vehicle controller 200 is generally arranged for communications on a vehicle communication network (not shown) that can include a bus in the vehicle(s) 102 such as a controller area network (CAN), or the like, and/or other wired and/or wireless mechanisms.

Via a vehicle network, the vehicle controller 200 transmits messages to various devices in the vehicle(s) 102 and/or receives messages from the various devices, for example, the one or more actuators 202, the HMI 206, etc. Alternatively, or additionally, in cases where the vehicle controller 200 includes multiple devices, the vehicle communication network is utilized for communications between devices represented as the vehicle controller 200 in this disclosure. Further, as discussed below, various other controllers and/or sensors provide data to the vehicle controller 200 via the vehicle communication network.

In addition, the vehicle controller 200, via a vehicle-side AVM algorithm 122, is configured for communicating through a vehicle-to-infrastructure communication network, such as communicating with an infrastructure controller (not shown). The vehicle controller 200, via the vehicle-side AVM algorithm 122, is also configured for communicating through a wireless vehicular communication interface with other traffic objects (e.g., vehicles, infrastructures, etc.), such as, via a vehicle-to-vehicle communication network. The vehicular communication network represents one or more mechanisms by which the vehicle controller 200 of the vehicle(s) 102 communicates with other traffic objects. As an example, the vehicular communication network may be one or more of wireless communication mechanisms, including any desired combination of wireless (e.g., cellular, wireless, satellite, microwave, and/or radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The one or more actuators 202 are implemented via circuits, chips, or other electronic and/or mechanical components that can actuate various vehicle subsystems in accordance with appropriate control signals. The one or more actuators 202 may be used to control braking, acceleration, and/or steering of the vehicle(s) 102. The vehicle controller 200 can be programmed to activate the one or more actuators 202 including propulsion, steering, and/or braking based on the planned acceleration or deceleration of the vehicle(s) 102.

The plurality of on-board sensors 204 include a variety of devices to provide data to the vehicle controller 200. For example, the plurality of on-board sensors 204 may include object detection sensors (e.g., lidar sensor(s)) disposed on or in the vehicle(s) 102 that provide relative locations, sizes, and/or shapes of one or more objects surrounding the vehicle(s) 102, such as additional vehicles, bicycles, robots, drones, etc., travelling next to, ahead, and/or behind the vehicle(s) 102. As another example, one or more of the plurality of on-board sensors 204 can be radar sensors affixed to one or more bumpers of the vehicle(s) 102 that may provide locations of the object(s) relative to the location of each of the vehicles 102.

The plurality of on-board sensors 204 may include a camera sensor, for example, to provide a front view, side view, rear view, etc., providing images from an area surrounding the vehicle(s) 102. As another example, the vehicle controller 200 may be programmed to receive sensor data from a camera sensor(s) and to implement image processing techniques to detect a road, infrastructure elements, etc. The vehicle controller 200 may be further programmed to determine a current vehicle location based on location coordinates (e.g., GPS coordinates) received from the vehicle(s) 102 indicative of a location of the vehicle 102 determined from a GPS sensor (not shown).

The HMI 206 is configured to receive information from the human operator during operation of the vehicle(s) 102. Moreover, the HMI 206 is configured to present information to the human operator, such as, an occupant of the vehicle(s) 102. In some variations, the vehicle controller 200 is programmed to receive destination data (e.g., location coordinates) from the HMI 206.

The vehicle system 208 is configured to control each of the subsystems within the vehicle(s) 102 and facilitate requests across each of the above-described components (e.g., the vehicle controller 200, the one or more actuators 202, the plurality of on-board sensors 204, and/or the HMI 206). Accordingly, the vehicle(s) 102 can be autonomously guided toward a waypoint using at least the plurality of on-board sensors 204. Routing can be performed using vehicle location, distance to travel, queue in line for vehicle marshaling, etc. It is understood that the entirety of the description associated with the vehicle 102 is applicable to each vehicle of the one or more vehicles 142*a*-142*h*.

In one or more embodiments, FIG. 3 shows an example system 300 for inspecting the vehicle 102. At the outset, and in one or more examples, an inspection-related checklist can be generated (e.g., created) based on one or more available functions of the vehicle 102. In one or more examples, the functions of the vehicle 102 can include, but is not limited to, any function related to a performance of a system associated with an interior of the vehicle 102, an exterior of the vehicle 102, or a combination thereof. In one or more examples, further related components of the vehicle 102 that can be categorized as the vehicle function are also described herein.

As an example, the inspection-related checklist is automatically generated by the vehicle-side AVM algorithm 122 of the vehicle 102. As another example, the inspection-related checklist can also be generated simultaneously by a system operator or generated by the system operator alternatively to the vehicle-side AVM algorithm 122. It is understood that the system operator can be a human operator or a non-human operator such as a mainframe controller, a machine-learning based control system, or any neural network. As yet another example, the inspection-related checklist is generated based on a stage the vehicle 102 is in related to the manufacturing process of the vehicle 102. In other words, the inspection-related checklist is generated based on one or more available functionalities of the vehicle 102 and/or which of those one or more available functionalities can be made observable by the one or more additional vehicles 142*a*-142*h* at any point in the marshaling environment 304.

In one or more embodiments, the vehicle 102 can include a vehicle function as part of the inspection-related checklist in a case wherein the vehicle 102 cannot yet perform the vehicle function. In the case wherein the vehicle 102 cannot yet perform the vehicle function, it is understood that an inspection of the vehicle function can be performed by each vehicle of the one or more additional vehicles 142*a*-142*h* once the vehicle 102 progresses through the manufacturing process and gains functionality associated with the vehicle function and/or performance of the vehicle function is observable by each vehicle of the one or more additional vehicles 142*a*-142*h*. In one or more embodiments, a temporary sensor suite (e.g., a temporary installment of one or more sensors) can be placed on the vehicle 102 to allow for the vehicle 102 to perform the vehicle function before the vehicle 102 is fully assembled and/or to enhance marshaling of the vehicle 102 within the marshaling environment 304.

In one or more embodiments, each vehicle of the one or more additional vehicles 142*a*-142*h* can transmit one or more commands to the vehicle 102 to perform the vehicle function associated with the inspection-related checklist. For example, the one or more transmitted commands causes the vehicle 102 to perform the vehicle function. As an example, the one or more commands can be transmitted within a geofenced location 302*a* of one or more geofenced locations 302*a*-302*d*. However, it is understood that the one or more commands can be transmitted within any geofenced location of the one or more geofenced locations 302*a*-302*d*. For example, each geofenced location of the one or more geofenced locations 302*a*-302*d* can correspond to one or more workstations within the marshaling environment 304 or any other landmark within the marshaling environment 304.

In one or more embodiments, the one or more commands is transmitted when each vehicle of the one or more additional vehicles 142*a*-142*h* determines (e.g., via the vehicle-side AVM algorithm 122) that each vehicle of the one or more additional vehicles 142*a*-142*h* is disposed in a position that affords each vehicle of the one or more additional vehicles 142*a*-142*h* a correct field of view to conduct the inspection of the vehicle function associated with the vehicle 102. In one or more examples, the correct field of view can be based on an orientation of each vehicle of the one or more additional vehicles 142*a*-142*h*. It is understood that the orientation of each vehicle of the one or more additional vehicles 142*a*-142*h* can refer to any positional or directional aspects relating to each vehicle of the one or more additional vehicles 142*a*-142*h* such as a vertical and/or a horizontal disposition of each vehicle of the one or more additional vehicles 142*a*-142*h* within the marshaling environment 304. In another example, the correct field of view can also be based on how one or more components of the vehicle 102 is viewed by a perception system of each vehicle of the one or more additional vehicles 142*a*-142*h*. For example, in an instance wherein each vehicle of the one or more additional vehicles 142*a*-142*h* can view both blinkers, both taillights, and/or the tailgate, then the vehicle 102 can be considered to be within the correct field of view.

In one or more embodiments, and in response to a receipt of the one or more commands, the vehicle 102 can perform the requested vehicle function. Simultaneously, each vehicle of the one or more additional vehicles 142*a*-142*h* is configured to perform the inspection of the vehicle function associated with the vehicle 102. In one or more examples, the inspection of the vehicle 102 is performed by at least the plurality of on-board sensors 204 associated with each vehicle of the one or more additional vehicles 142*a*-142*h*. As another example, each vehicle of the one or more additional vehicles 142*a*-142*h* is configured to inspect each side of the vehicle 102 (e.g., a front of the vehicle 102, a rear of the vehicle 102, one or more sides of the vehicle 102).

As yet another example, each vehicle of the one or more additional vehicles 142*a*-142*h* can evaluate a quality of performance of the vehicle function to any degree of specificity. For example, the quality of performance can correspond to, but is not limited to, a brightness of an illumination of a taillight of the vehicle 102, a color of an exterior of the vehicle 102, or a frequency of a blinking function of one or more blinkers of the vehicle 102. As a further example, each vehicle of the one or more additional vehicles 142*a*-142*h* can identify potential abnormality associated with one or more components of the vehicle 102 based on performance of the vehicle function. For example, a potential abnormality can indicate, but is not limited to, a crack in one or more lenses of the vehicle 102, one or more tire punctures of the vehicle 102, or one or more scratches along the exterior of the vehicle 102.

In one or more embodiments, particular vehicle functions on the inspection-related checklist can be performed within particular geofenced locations of the geofenced locations 302*a*-302*d*. In one or more embodiments, the inspection of the vehicle 102 can include a validation of a behavior of the vehicle 102 in a case wherein the one or more additional vehicles 142*a*-142*h* are inspecting performance of a vehicle function related to one or more systems of the vehicle 102. For example, the one or more systems can include an audio system, a mapping system, a display system, among others. In one or more embodiments, the inspection of the vehicle 102 can include a validation of one or more features of the vehicle 102 such as an interior feature of the vehicle 102, an exterior feature of the vehicle 102, or a combination thereof. For example, the one or more features of the vehicle 102 can include, but is not limited to, one or more sound exciters, a map lamp, an HMI display, actuation of exterior lights of the vehicle 102, actuation of exterior displays of the vehicle 102, opening and closing features of the vehicle (e.g., related to windows), or a combination thereof. In a case wherein certain vehicle functions cannot be performed in certain areas of the marshaling environment 304, the vehicle 102 can be marshaled (e.g., by the infrastructure system 110) to a geofenced location of the one or more geofenced locations 302*a*-302*d* that will allow for the certain vehicle function to be performed by the vehicle 102 in observance by the one or more additional vehicles 142*a*-142*h*.

In one or more embodiments, and at the completion of the performance of the vehicle function, the one or more additional vehicles 142*a*-142*h* are configured to communicate one or more results of the inspection to the vehicle 102. For example, the one or more results can be a pass/fail result of the inspection or include any information associated with the inspection. In a case wherein the vehicle 102 passes the inspection, no further action is needed and the vehicle 102 can progress through the manufacturing process. However, in a case wherein the vehicle 102 does not pass the inspection, the vehicle 102 is configured to transmit an alert to a technician and/or the one or more additional vehicles 142*a*-142*h*. In one or more examples, the alert causes the technician and/or the one or more additional vehicles 142*a*-142*h* to perform an additional inspection of at least the vehicle function that did not pass the initial inspection. In one or more examples, one or more results of the additional inspection can indicate one or more diagnostic actions that should be performed on the vehicle 102 so that the vehicle 102 can pass the additional inspection. For example, the one or more diagnostic actions can indicate one or more repairs to the vehicle 102, which may be performed by the technician, any of the one or more additional vehicles 142*a*-142*h*, and/or the vehicle 102 itself.

In one or more embodiments, continuous inspection of the vehicle 102 can be performed by the one or more additional vehicles 142*a*-142*h* (e.g., or other vehicles) as the vehicle 102 moves through the marshaling environment 304. It is understood that the vehicle 102 can be configured to inspect each of the one or more additional vehicles 142*a*-142*h* as well. In one or more embodiments, the one or more additional vehicles 142*a*-142*h* and/or the vehicle 102 can monitor for, and detect, one or more issues with the marshaling environment 304 and/or surrounding vehicles such as, but not limited to, a dropped part, a misalignment of a part, one or more missing bolts, an incorrect color trim, among others. The one or more additional vehicles 142*a*-142*h* and/or the vehicle 102 can be configured to detect whether there are any issues with a manufacturing line based on the monitoring of the one or more issues with the marshaling environment 304 such as, but not limited to, levels associated with one or more components or products associated with the movement of the one or more additional vehicles 142*a*-142*h* and/or the vehicle 102 through the marshaling environment 304.

The one or more additional vehicles 142*a*-142*h* and/or the vehicle 102 can also monitor for movements of one or more technicians within the marshaling environment 304 and advance policies associated with the manufacturing process based on historical data associated with the movements of the one or more technicians. For example, advancement of the policies can be determined through the utilization of image recognition and/or artificial intelligence.

The one or more additional vehicles 142*a*-142*h* and/or the vehicle 102 can also monitor temperature levels and/or humidity levels of the marshaling environment 304 based on a measurement of the temperature levels and/or the humidity levels by the plurality of on-board sensors 204. As an example, the temperature levels and/or the humidity levels can affect an ability for an adhesive to adhere properly to the vehicle 102. Additionally, the one or more additional vehicles 142*a*-142*h* and/or the vehicle 102 can monitor a cleanliness of each vehicle of the one or more additional vehicles 142*a*-142*h* and/or the vehicle 102 based on the utilization of the plurality of on-board sensors 204. For example, in an instance wherein a level of cleanliness of a particular vehicle does not satisfy a threshold, any of the one or more additional vehicles 142*a*-142*h* and/or the vehicle 102 can report to the technician that the particular vehicle needs to be cleaned. The technician is then caused to clean, or facilitate the cleaning of, the particular vehicle that needs to be cleaned based on the report.

Figure 4:
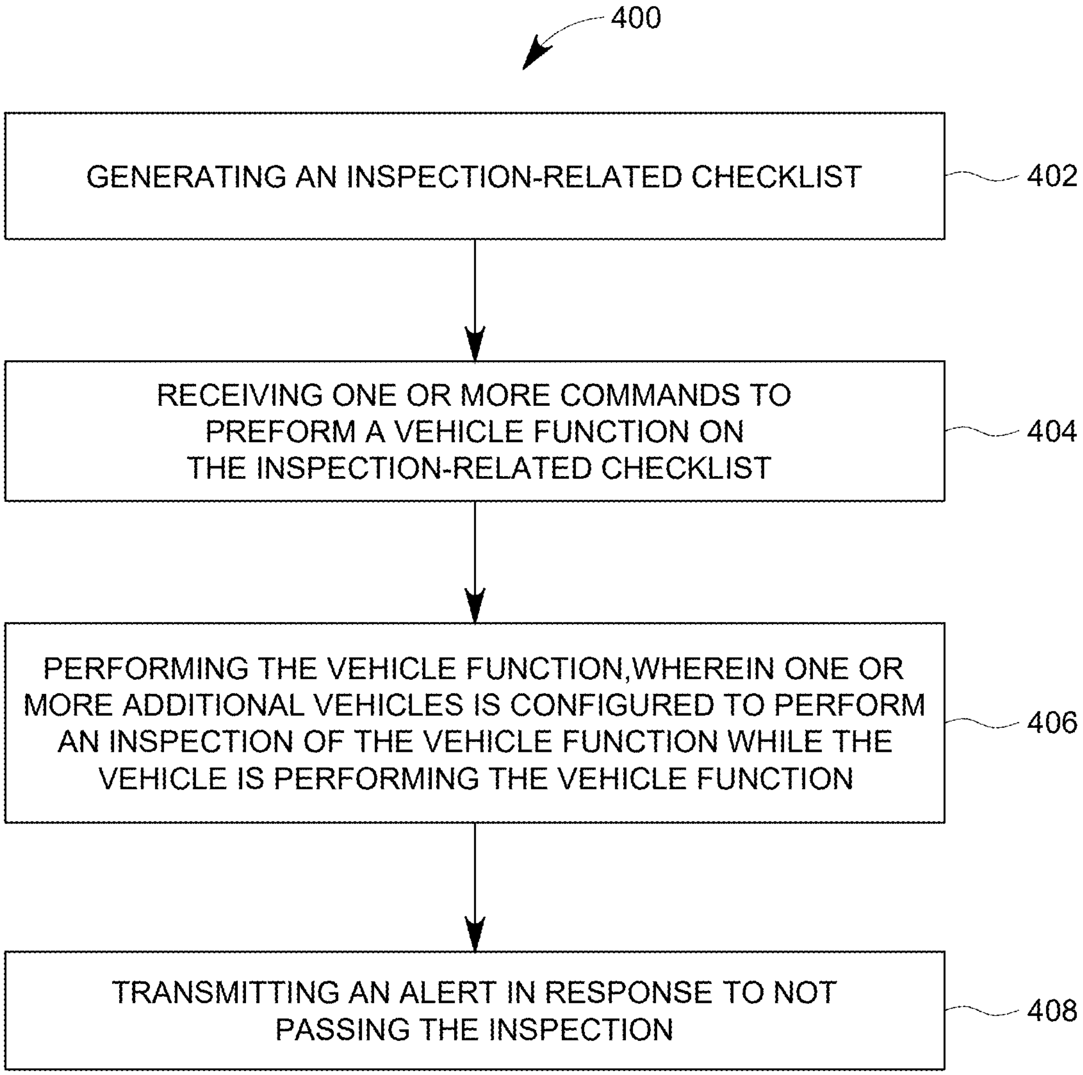
FIG. 4 is a flowchart illustrating an example method for inspecting a vehicle in accordance with one or more embodiments of the present disclosure.

FIG. 4 is a flowchart illustrating an example method 400 for inspecting a vehicle (e.g., the vehicle 102). At operation 402, an inspection-related checklist is generated by the vehicle. For example, the inspection-related checklist is generated based on one or more vehicle functions of the vehicle. As another example, a different vehicle function of the one or more vehicle functions is performed in different geofenced locations (e.g., the one or more geofenced locations 302a-302d) in which the vehicle is positioned.

At operation 404, one or more commands to perform a vehicle function of the one or more vehicle functions on the inspection-related checklist is received. For example, the one or more commands is received from one or more additional vehicles (e.g., the one or more additional vehicles 142a-142h). As another example, the receipt of the one or more commands is further based on a pose of the vehicle being within a field of view of the one or more additional vehicles. As yet another example, the field of view of the one or more additional vehicles is associated with the vehicle function.

At operation 406, the vehicle function is performed by the vehicle. For example, the vehicle function is performed in response to the receipt of the one or more commands. As another example, the one or more additional vehicles is configured to perform an inspection of the vehicle function while the vehicle is performing the vehicle function. As yet another example, the inspection of the vehicle function is a visual inspection performed by an exterior sensor suite of the one or more additional vehicles. As a further example, the exterior sensor suite is permanently integrated within a body of the one or more additional vehicles or temporarily affixed to the body of the one or more additional vehicles.

At operation 408, an alert is transmitted by the vehicle in response to not passing the inspection. For example, the transmission of the alert causes the one or more additional vehicles to perform an additional inspection of the vehicle function. As another example, one or more diagnostic actions are performed on the vehicle to cause the vehicle to pass the additional inspection. In one or more embodiments, the one or more additional vehicles is further configured to perform an inspection of a vehicle feature, a vehicle quality, or a combination thereof.

Figure 5:
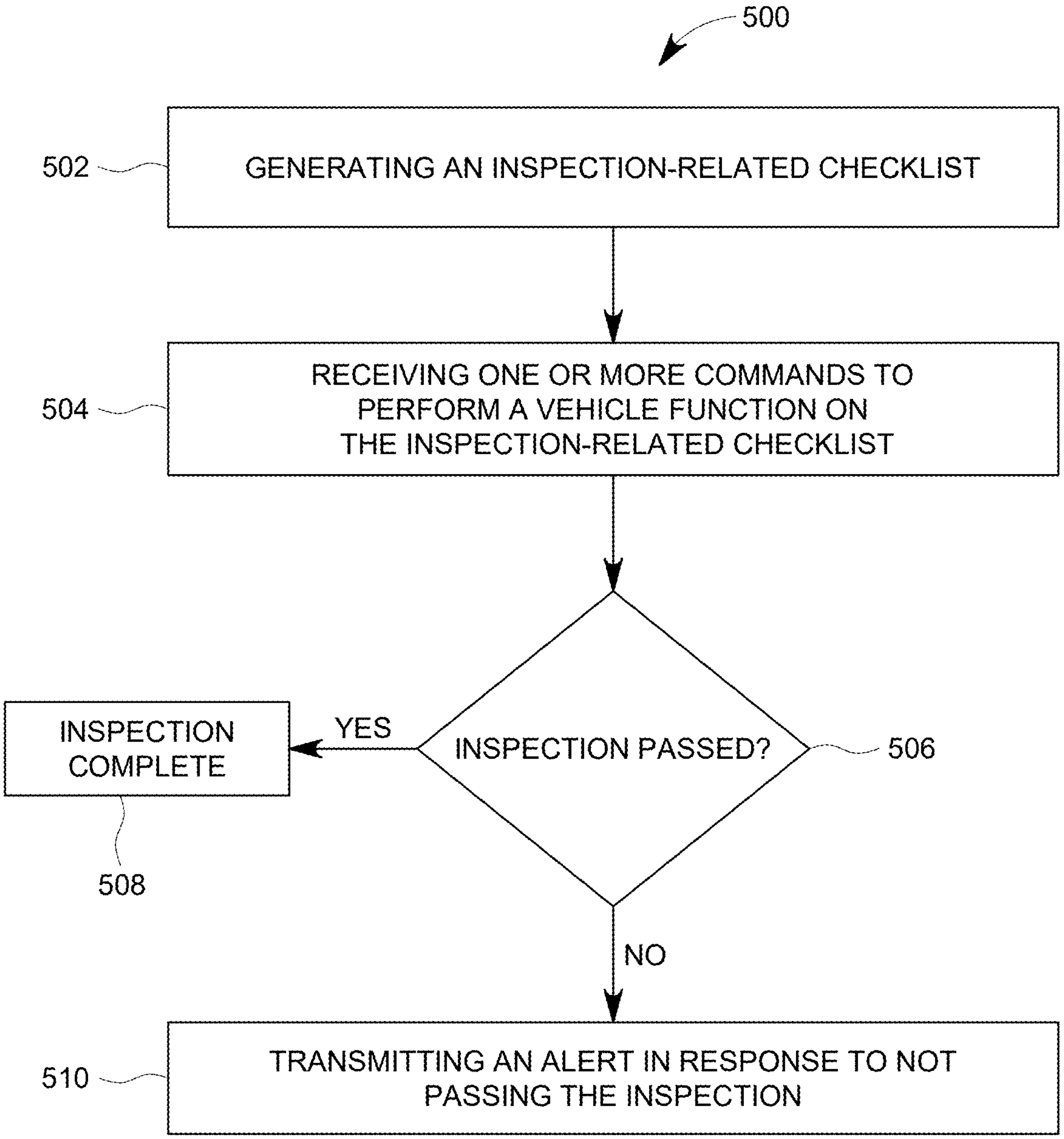
FIG. 5 is a flowchart illustrating another example method for inspecting a vehicle in accordance with one or more embodiments of the present disclosure.

FIG. 5 is a flowchart illustrating another example method 500 for inspecting a vehicle (e.g., the vehicle 102). At operation 502, an inspection-related checklist is generated by the vehicle. For example, the inspection-related checklist is generated based on one or more vehicle functions of the vehicle. At operation 504, one or more commands to perform a vehicle function of the one or more vehicle functions on the inspection-related checklist is received. For example, the one or more commands is received from one or more additional vehicles (e.g., the one or more additional vehicles 142a-142h).

At operation 506 a determination is made related to whether the vehicle passes an inspection performed by the additional vehicles. In one or more embodiments, the additional vehicles are configured to inspect the vehicle function while the vehicle is performing the vehicle. In another one or more embodiments, the additional vehicles are also configured to inspect a vehicle feature, a vehicle quality, or a combination thereof. For example, the vehicle feature can be, but is not limited to, any functional aspect of an interior of the vehicle, an exterior of the vehicle, or a combination thereof. As another example, the vehicle quality can be, but is not limited to, any aesthetic related feature associated with the vehicle. In an instance wherein the vehicle is determined to have passed the inspection, the inspection is complete (e.g., at operation 508). However, in an instance wherein the vehicle is determined to have not passed the inspection, an alert is transmitted by the vehicle at operation 510. For example, the transmission of the alert causes the one or more additional vehicles to perform an additional inspection of the vehicle function. As another example, one or more diagnostic actions are performed on the vehicle to cause the vehicle to pass the additional inspection.

Figure 6:
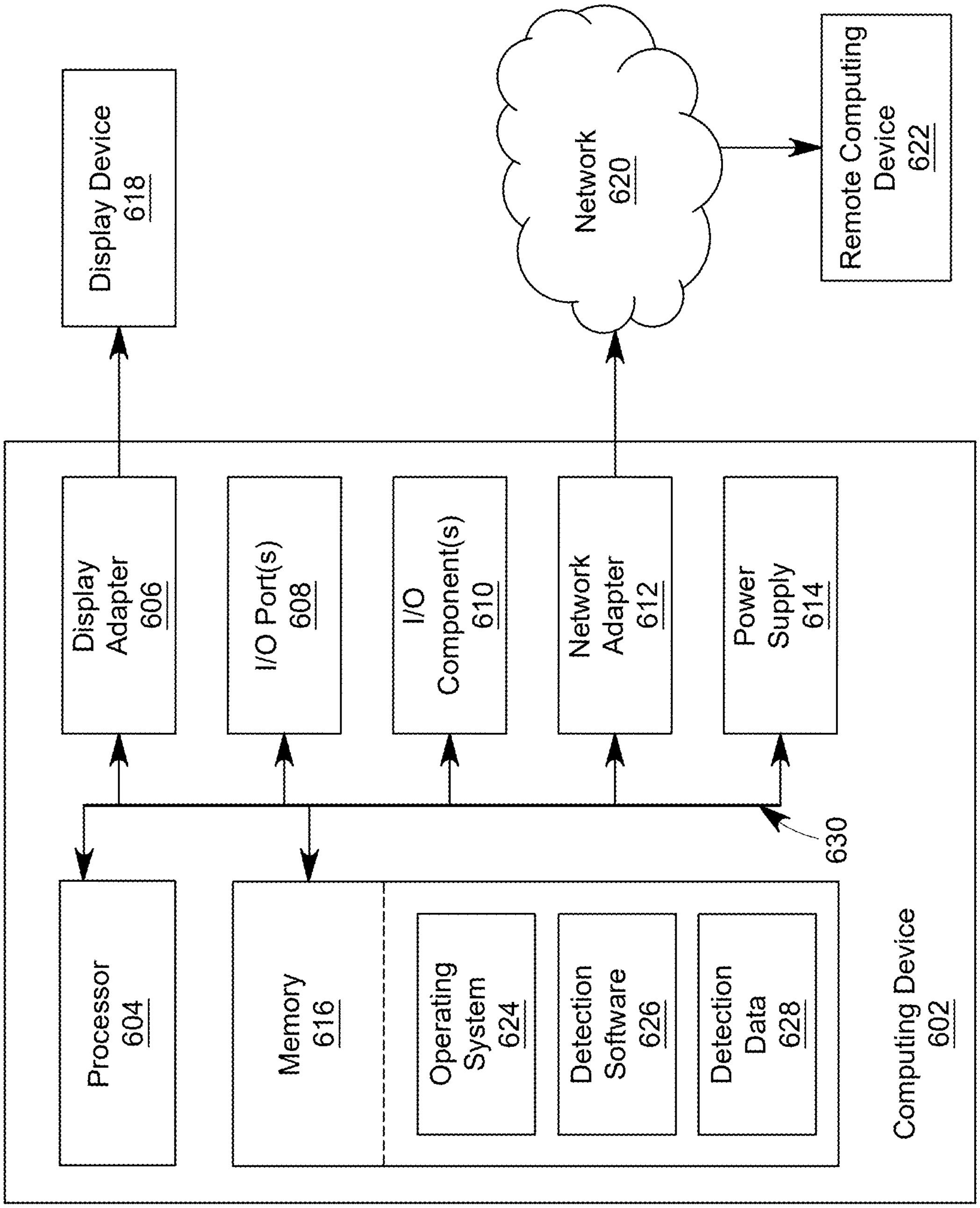
FIG. 6 is a block diagram illustrating an example computer system in accordance with one or more embodiments of the present disclosure.

FIG. 6 illustrates an operating environment, such as a computer system, that facilitates the performance of one or more systems and methods described herein. More specifically, the systems and methods described herein can be implemented using a computing device 602. For example, the computing device 602 can be a personal computer, a desktop, a laptop, a tablet, a hand-held computer, a server, a workstation, a mainframe, a wearable computer, a supercomputer, or a combination thereof. However, it is understood that the aforementioned examples of the computing device 602 is non-exhaustive and the computing device 602 can be any type of processing or computing device. The computing device 602 generally includes a processor 604, a display adapter 606, one or more input/output port(s) 608, one or more input/output component(s) 610, a network adapter 612, a power supply 614, and a memory 616. However, it is understood that the computing device 602 can include any additional components therein and is not required to include any of the listed components (e.g., the processor 604, the display adapter 606, the one or more input/output port(s) 608, the one or more input/output component(s) 610, the network adapter 612, the power supply 614, and the memory 616).

The processor 604 is configured to provide instructions to the computing device 602 so that the computing device 602 can process one or more tasks including the implementation of a software program to perform one or more operations as described in more detail herein. It is also understood that the computing device 602 may include any number or processors 604 therein. The display adapter 606 can be a graphics card or a video board that provides the computing device 602 with a capability to display content on a display device 618. For example, the display device 618 can be any screen, monitor, and/or light-emitting component associated with any of the personal computer, the desktop, the laptop, the tablet, the hand-held computer, the server, the workstation, the mainframe, the wearable computer, the supercomputer, or a combination thereof. However, it is understood that the aforementioned examples of the display device 618 is non-exhaustive and that the display device 618 can be any type of device capable of providing a visual display.

The input/output port(s) 608 provide a number of interfaces (e.g., sockets) for one or more cables to connect to the computing device 602. It is understood that there may be any number of input/output port(s) 608 on the computing device 602. For example, the input/output port(s) 608 provides a means for the computing device 602 to receive signals and/or data from an external device connected to the computing device 602 via the one or more cables. As another example, the input/output port(s) 608 provide a means for the computing device 602 to send signals and/or data to an external device connected to the computing device 602 via the one or more cables. The input/output component(s) 610 can include one or more components that support the input/output port(s) 608 such as, but not limited to, a switch, a push button, a pressure mat, a float switch, a keypad, a radio receive, or a combination thereof.

The network adapter 612 can be any type of network interface controller that is configured to provide a means for communicating over a network 620 with another computing device, such as a remote computing device 622. For example, the remote computing device 622 can be a user device such as a cellular-phone, a smartphone, a tablet, a laptop, or a combination thereof. The power supply 614 is configured to convert alternating high voltage current (e.g., AC) into direct current (e.g., DC) to provide power to the other components (e.g., the processor 604, the display adapter 606, the one or more input/output port(s) 608, the one or more input/output component(s) 610, the network adapter 612, and the memory 616) of the computing device 602.

Additionally, the memory 616 can be a mass storage device and/or a system memory such as a hard disk drive, a memory card, a solid-state drive, RAM, or a combination thereof. The memory 616 is configured to provide storage for instructions and data associated with the operation of the computing device 602. The memory 616 can generally include an operating system 624, detection software 626, and detection data 628 to perform one or more operations described in more detail herein. For example, the operating system 624 is configured to manage and/or process any of the data and/or instructions associated with the detection software 626 and/or the detection data 628, as described in more detail herein.

Furthermore, a system bus 630 is also included within the computing device 602 that is configured to couple each of the various components (e.g., the processor 604, the display adapter 606, the one or more input/output port(s) 608, the one or more input/output component(s) 610, the network adapter 612, the power supply 614, and the memory 616) of the computing device 602. It is also understood that each of the components of the computing device 602, and the functionality associated with each of the components of the computing device 602, may be implemented within the remote computing device 622. While the operating environment illustrated within FIG. 6 depicts a particular configuration associated with at least the computing device 602, the network 620, and the remote computing device 622, it is understood that the operating environment may be configured in any way.

Thus, one or more examples of the present disclosure provides a means for inspecting a performance of a vehicle function by a vehicle by one or more other vehicles within an observable range of the vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

generating, by a vehicle, an inspection-related checklist based on one or more vehicle functions of the vehicle;

receiving, by the vehicle from one or more surrounding vehicles, one or more commands to perform a vehicle function of the one or more vehicle functions on the inspection-related checklist;

performing, by the vehicle, the vehicle function in response to the receipt of the one or more commands, wherein the one or more surrounding vehicles is configured to perform an inspection of the vehicle function while the vehicle is performing the vehicle function; and transmitting, by the vehicle, an alert in response to not passing the inspection.

2. The method of claim 1, wherein the receipt of the one or more commands is further based on a pose of the vehicle being within a field of view of the one or more surrounding vehicles, and wherein the field of view of the one or more surrounding vehicles is associated with the vehicle function.

3. The method of claim 1, wherein the inspection of the vehicle function is a visual inspection performed by an exterior sensor suite of the one or more surrounding vehicles.

4. The method of claim 3, wherein the exterior sensor suite is permanently integrated within a body of the one or more surrounding vehicles or temporarily affixed to the body of the one or more surrounding vehicles.

5. The method of claim 1, wherein a different vehicle function of the one or more vehicle functions is performed in different geofenced locations in which the vehicle is positioned.

6. The method of claim 1, wherein the transmission of the alert causes the one or more surrounding vehicles to perform an additional inspection of the vehicle function, and wherein:

one or more diagnostic actions are performed on the vehicle to cause the vehicle to pass the additional inspection.

7. The method of claim 1, wherein the one or more surrounding vehicles is further configured to perform an inspection of a vehicle feature, a vehicle quality, or a combination thereof.

8. A system comprising:

a vehicle configured to:

generate an inspection-related checklist based on one or more vehicle functions of the vehicle, receive one or more commands to perform a vehicle function of the one or more vehicle functions on the inspection-related checklist, perform the vehicle function in response to the receipt of the one or more commands, and transmit an alert in response to not passing an inspection of the vehicle function; and one or more surrounding vehicles configured to:

transmit the one or more commands to perform the vehicle function, and perform the inspection of the vehicle function while the vehicle is performing the vehicle function.

9. The system of claim 8, wherein the receipt of the one or more commands is further based on a pose of the vehicle being within a field of view of the one or more surrounding vehicles, and wherein the field of view of the one or more surrounding vehicles is associated with the vehicle function.

10. The system of claim 8, wherein the inspection of the vehicle function is a visual inspection performed by an exterior sensor suite of the one or more surrounding vehicles.

11. The system of claim 10, wherein the exterior sensor suite is permanently integrated within a body of the one or more surrounding vehicles or temporarily affixed to the body of the one or more surrounding vehicles.

12. The system of claim 8, wherein a different vehicle function of the one or more vehicle functions is performed in different geofenced locations in which the vehicle is positioned.

13. The system of claim 8, wherein the one or more surrounding vehicles is further configured to:

identify one or more impaired components of the vehicle in response to the vehicle performing the vehicle function.

14. The system of claim 8, wherein the transmission of the alert causes the one or more surrounding vehicles to perform an additional inspection of the vehicle function, and wherein:

one or more diagnostic actions are performed on the vehicle to cause the vehicle to pass the additional inspection.

15. One or more non-transitory computer-readable media storing processor-executable instructions that, when executed by at least one processor, cause the at least one processor to:

generate, by a vehicle, an inspection-related checklist based on one or more vehicle functions of the vehicle;

receive, by the vehicle from one or more surrounding vehicles, one or more commands to perform a vehicle function of the one or more vehicle functions on the inspection-related checklist;

perform, by the vehicle, the vehicle function in response to the receipt of the one or more commands, wherein the one or more surrounding vehicles is configured to perform an inspection of the vehicle function while the vehicle is performing the vehicle function; and transmit, by the vehicle, an alert in response to not passing the inspection.

16. The one or more non-transitory computer-readable media of claim 15, wherein the receipt of the one or more commands is further based on a pose of the vehicle being within a field of view of the one or more surrounding vehicles, and wherein the field of view of the one or more surrounding vehicles is associated with the vehicle function.

17. The one or more non-transitory computer-readable media of claim 16, wherein the inspection of the vehicle function is a visual inspection performed by an exterior sensor suite of the one or more surrounding vehicles.

18. The one or more non-transitory computer-readable media of claim 17, wherein the exterior sensor suite is permanently integrated within a body of the one or more surrounding vehicles or temporarily affixed to the body of the one or more surrounding vehicles.

19. The one or more non-transitory computer-readable media of claim 15, wherein a different vehicle function of the one or more vehicle functions is performed in different geofenced locations in which the vehicle is positioned.

20. The one or more non-transitory computer-readable media of claim 15, wherein the transmission of the alert causes the one or more surrounding vehicles to perform an additional inspection of the vehicle function, and wherein:

one or more diagnostic actions are performed on the vehicle to cause the vehicle to pass the additional inspection.

* * * * *